3,825,563
PRODUCTION OF STABLE, NONHYDROUS, HOMOGENEOUS, IN NATURAL AND MINERAL OILS SOLUBLE VITAMIN-E-ACTIVE CREAM-BASE-COESTERS OF THE MINERAL-OIL-INSOLUBLE d-ALPHA-TOCOPHERYL-ACID-SUCCINATE WITH ANHYDROUS OILS

Gerhard W. Ahrens, 1781 E. 15th St., Brooklyn, N.Y.
No Drawing. Continuation-in-part of abandoned application Ser. No. 862,927, Oct. 1, 1969. This application Apr. 13, 1971, Ser. No. 133,757
Int. Cl. C07d 7/22
U.S. Cl. 260—345.5         4 Claims

ABSTRACT OF THE DISCLOSURE

The invention concerns a method for preparing stable, nonhydrous homogeneous, in natural and mineral oils soluble Vitamin-E-active cream-base-co-esters of the mineral-oil-insoluble d-alpha-tocopheryl-acid-succinate with anyhdrous oils by the direct esterification reaction between the said d-alpha-tocopheryl-acid-succinate and the anhydrous oils or, in a modification thereof, by the said direct esterification reaction between the d-alpha-tocopheryl-acid-succinate, magnesium stearate as a partial substituent for the expensive d-alpha-tocopheryl-acid-succinate and the anhydrous oils, carried to completion by the application of gradually increasing reaction temperatures to the reaction mixture consisting of the said d-alpha-tocopheryl-acid-succinate, with or without its partial substituent magnesium stearate, and the anhydrous oils lacking both in practical water absorption capacities and therefore facilitating water formed in the reaction to vaporize as the esterification reaction goes to completion forming thereby the stable, nonhydrous, homogeneous and in natural and mineral oils soluble Vitamin-E-active cream-base-co-esters of d-alpha-tocopheryl-acid-succinate with anhydrous oils as are excellently suited for versatile additions of Vitamin-E-active potencies to a wide variety of topical natural as well as mineral oil base preparations for the ready introduction therein of a wide range of Vitamin E potencies from as low as 25 I.U. to as much as about 726 I.U. Vitamin E, without requiring the use of emulsifying agents, or which may be used as is in their creamy cream-base-co-ester form, per se.

This application is a continuation-in-part of Ser. No. 862,,927, filed Oct. 1, 1969, which was-copending herewith, but is now abandoned.

This invention relates to new stable, nonhydrous, homogeneous, natural oil soluble and mineral oil soluble Vitamin-E-active cream-base-co-esters of the mineral-oil-insoluble d - alpha - tocopheryl-acid-succinate intermediate with anhydrous oils such as are heretofore not known in the art, and it is one of the principal objects of this invention to provide such a Vitamin-E-active cream-base-co-ester which is soluble in natural as well as mineral oils and therefore extremely versatile in its usefulness as is and as ingredient of topical cosmetic and therapeutic preparations for the ready introduction therein of a wide variety of different Vitamin E potencies such as may be desirable ranging from as low as about 25 I.U. Vitamin E potency to as high as possibly even Vitamin E potencies of 726 I.U. per gram material, without requiring the presence therein of emulsifying agents nor application of homogenizing procedures in order to obtain such absolutely homogeneous final products.

Although Vitamin-E-active topical and therapeutic preparations are not new, due to the fact that almost all of the cream bases for such preparations are, for economical and stability reasons, of the mineral oil type, the use of tocopherols as a source for Vitamin E activity was restricted to the less stable but mineral oil soluble ones such as the alpha-tocopherol and its acetate esters known to be attacked upon exposure to air (see Textbook of Organic Medical and Pharmaceutical Chemistry, 4th edition, 1962, page 808, by Wilson et al.), whereas the stable, upon exposure to air unattacked d-alpha-tocopheryl-acid-succinate and therefore more stable and therefore also more desirable source for Vitamin E is restricted to uses with natural oil type cream bases because same is not soluble in mineral oils and if added to mineral oils will form a separate layer therein even after heating together and agitating for solvation therein. However, with the event of my invention, this use with mineral oils and mineral oil base cream bases has now been achieved and a desirably stable d-alpha-tocopheryl-acid succinate in a novel form of a cream-base-co-ester has been prepared as result of a direct reaction carried out between the d-alpha-tocopheryl-acid-succinate with anhydrous oils, including natural and mineral oil base materials or, in a modification thereof, by the said direct reaction between the d-alpha-tocopheryl-acid-succinate, magnesium stearate as a partial substituent for the expensive d-alpha-tocopheryl-acid-succinate and the anhydrous oils, and carried to completion by the application of gradually increasing reaction temperatures to the reaction mixture consisting of the said d-alpha-tocopheryl-acid succinate, with or without its partial substituent magnesium stearate, and the anhydrous oils lacking both in practical water absorption capacities and therefore facilitating water formed in the reaction to vaporize as esterification goes to completion.

Cream-base-co-esters formed in this manner were found to be unusually stable, homogeneous and soluble in both natural and minerals oils and cream bases generally employed in the manufacture of topical cosmetic and therapeutic preparations and when added to such did not require the presence of emulsifying agents nor was homogenization needed in order to attain desired homogeneities therein and thus constituted among other aspects also in this respect an important advance in the art.

As in my co-pending application Ser. No. 862,926, filed Oct. 1, 1969, now abandoned, and in the filed continuation-in-part thereof Ser. No. 128,535, filed Mar. 26, 1971, co-ester formation between reactants possessing virtually no water absorption capacities such as the intermediate d-alpha-tocopheryl-acid-succinate having previously been formed as a result of the reaction of a tocopherol with a Grignard reagent and subsequent further treatment of the resulting reaction product with succinic anhydride, such as, for instance, described in U.S. Pat. 2,407,726, and the phenylic aromatic alcohol of the formula

$$C_6H_5CH_2CH_2CH_2OH$$

reacting therewith had led to novel properties possessed by the resulting ester, including acquiring solubility properties in both natural and mineral oil base materials, in my present application, too, the co-ester formation between reactants also possessing virtually no water absorption capacities such as the same intermediate d-alpha-tocopheryl-acid-succinate and anhydrous oils reacting with one another, has also resulted in acquiring novel properties possessed by the resulting ester, including acquiring solubility properties in both natural and mineral oil base materials, both reactions thereby apparently depending for their success on the lack of practical water absorption capacity on the part of the reactants which while the reactions go to completion facilitates removal of water formed in the reaction by vaporization at reaction temperatures of not less than the boiling point of water.

In carrying out the invention, the co-ester formation between the d-alpha-tocopheryl-acid-succinate having previously been formed by the reaction of a tocopherol with a Grignard reagent and as the result of subsequent further treatment of the resulting reaction product with succinic anhydride, such as, for instance, described in U.S. Pat. 2,407,726 and the selected anhydrous oil is facilitated as follows:

530.39 parts by weight, which is equivalent to the formula weight, of d-alpha-tocopheryl-acid-succinate are mixed with 1014 parts by weight, which is equivalent to the average computed formula weight, of sweet almond oil, or, in percent of the reaction mixture, 34.34 percent by weight of d-alpha-tocopheryl-acid-succinate and 65.66 percent by weight of sweet almond oil, are reacted with one another by the application of reaction temperatures of not less than the boiling point of water for a period of time sufficient to remove water formed in the reaction while going to completion. The resulting creamy cream-base-co-ester is homogeneous, stable, nonhydrous, soluble in natural and mineral oil base materials.

Reacting in the same manner 34.34 percent by weight d-alpha-tocopheryl-acid-succinate with 65.66 percent by weight of anhydrous mineral oil base material, a similarly homogeneous, stable, nonhydrous creamy cream-base-co-ester is formed which, too, is soluble in natural and mineral oil base materials, and it has been found that in order to prepare stable creamy cream-base-co-esters of d-alpha-tocopheryl-acid-succinate with either natural or mineral oil base materials, at least 34.34 parts by weight percent of the d-alpha-tocopheryl-acid-succinate and no more than 65.66 parts by weight percent of the anhydrous oil must be present or, in a modification thereof, at least 34.34 parts by weight percent, including where used from 2.8 to 30 parts by weight percent magnesium stearate as a partial substituent, of the d-alpha-tocopheryl-acid-succinate and no more than 65.66 parts by weight percent of the anhydrous oil.

Throughout the specification the term anhydrous oil shall include all anhydrous oils that are edible and useful in cosmetic and therapeutic preparations, including mineral oils and oil base materials such as petrolatum and petroleum jelly or vaseline; various vegetable and plant oils and fats, including sweet almond oil, olive oil, sesamin oil, peanut oil and the like; fat and oil-soluble glyceryl stearates and palmitates such as used as fillers and thickeners for oils; hydrogenated fats and oils and animal fats and oils, including lard.

Describing now in detail the reaction leading to the formation of the desired creamy cream-base-co-esters of the invention as being formed between d-alpha-tocopheryl-acid-succinate and anhydrous oils, the admixed d-alpha-tocopheryl-acid-succinate and anhydrous oil constituents, including, where used in a modification thereof, magnesium stearate as a partial substituent for d-alpha-tocopheryl-acid-succinate, are placed in a reaction vessel, made of inert material, preferably of pyrex glass or glass-lined, and then heated therein, with occasional agitation, until the d-alpha-tocopheryl-acid-succinate melts, respectively dissolves in the oil, whereby it should be noted that in the event of using mineral oil no solvation between the de-alpha-tocopheryl-acid-succinate and the oil takes place and the molten d-alpha-tocopheryl-acid-succinate forms with the mineral oil two distinct uncombined layers. Too, since mere dissolving of d-alpha-tocopheryl-acid-succinate in a natural oil does not induce ester formation and d-alpha-tocopheryl-acid-succinate only sparsely soluble therein is, if the solution of d-alpha-tocopheryl-acid-succinate in a natural oil is allowed to cool and stand, there will slowly separate out within the only mass and, when the concentration of d-alpha-tocopheryl-acid-succinate therein is high enough to have formed a creamy mass therewith, also separate out within the creamy mass, a large preponderance of crystals that make any product such as this unsalable as it is most unpleasant to the touch and absolutely nonhomogeneous, and further, if heating of the reaction mixture is continued to the boiling point of water, as described in my patent application Ser. No. 862,927, filed Oct. 1, 1969, now abandoned, and the material mixture is reacted by repeatedly heating and cooling the same through a period of time until the resulting creamy mass is free of separating crystals, suitable creamy esters could be formed only at the costs of long periods of time, often requiring several weeks of repeating heating and cooling periods before achieving it to thereby make this method though a successful but extremely uneconomical one, whereas, if the reaction is carried out at higher temperatures, ester formation is greatly speeded up particularly since in the absence of any practical water absorption capacity by either of the reactants removal of water formed in the reaction is facilitated while simultaneously going to completion.

Thus, in continuing the heating of the mixed reactants beyond the point when they are in a mixed molten, respectively solvated state which is when a temperature of 90° C. is reached, the reaction is started at 100° C., which is the boiling point of water, calling it zero time, by slowly raising the reaction temperature in the closed reaction vessel so as to reach about a temperature of 110° C. within a period of about ten minutes time and holding this temperature in the reaction vessel for another ten minutes time after which the reaction vessel is opened to allow for the escape of water vapor as it forms from the water formed in the reaction. I increase the temperature now in the reaction vessel still further to reach 135° C. at 40 minutes after zero time and 145° C. after 50 minutes zero time when coincident with the completion of the ester formation also the formation of water vapor ceases thereby terminating the reaction.

It is quite apparent that the formation of the creamy cream-base-co-esters of the invention by the application of heat beyond the boiling point of water instead of employing repeated heating and cooling periods up to the boiling point of water as in my patent application Ser. No. 862,927, filed Oct. 1, 1969 is highly economical and time-saving, whereby it should also be noted that the hot oil during the reaction with d-alpha-tocopheryl-acid-succinate acts likewise as a protective environment for the same.

In using magnesium stearate as a partial substituent for d-alpha-tocopheryl-acid-succinate where it might be desirable, it is not only the cost-saving which can be extremely impressive when one considers that the current price of d-alpha-tocopheryl-acid-succinate is about 67 dollars per kilo, but also the versatility thereby achieved in the useful applications to topical creams to which smaller additions and larger additions of the creamy cream-base-co-esters of the invention can be made at will to provide Vitamine E potencies as low as about 25 I.U. or as high as about 726 I.U. per gram material. Too, as regards the use of the creamy cream-base-co-esters of the invention, their introduction into topical cream preparations does not require the presence therein of an emulsifying agent nor is such an agent desirable therein as it introduces into any cream preparations no matter which definite instabilities since emulsifiers are known to break down whereas creamy cream-base-co-esters of the type produced by the invention represent stable entities by themselves not subject to breaking down, and whereas emulsified creams contain the emulsifier as a foreign entity subject to breaking down with the slightest change in the composition of the cream, the creamy cream-base-co-esters of the invention are not affected by changes in the compositions of a cream. They represent creams by themselves and may even be used by themselves, particularly where high concentrations of Vitamin E potencies are desired in a topical preparation, also in conjunction with high stabilities against air attack upon exposure to the atmosphere.

In order to better understand the invention and its scope, which, however, shall not be construed to be limited thereto, the following tables help illustrate the same by a number of examples representative thereof:

In Table 1 are presented examples of compositions representative of the new cream-base-co-ester of the invention, which includes esters formed between d-alpha-tocopheryl-acid-succinate and anhydrous oils, including natural and mineral oils, which may be used as is or as additives to precompounded topical cosmetic and therapeutic preparations as a source therein of Vitamin E.

In Table 2 are presented examples of compositions representative of useful preparations wherein part of the d-alpha-tocopheryl-acid-succinate in the new cream-base-co-ester of the invention formed of d-alpha-tocopheryl-acid-succinate and anhydrous oils is substituted with magnesium stearate. These examples, too, may be used as is or added to precompounded topical cosmetic and therapeutic preparations as a source therein of Vitamin E.

In Table 3 are presented examples of preparations produced with some of the compositions in tables 1 and 2 for use cosmetically and therapeutically as preparations containing Vitamin E.

Table 1

Examples of Compositions Representative of the Cream-Base-Co-Ester for use as is or as additive to precompounded topical preparations—In Weight Percent:

| Ingredients | A | B | C | D | E | F | G | H | I | J | K |
|---|---|---|---|---|---|---|---|---|---|---|---|
| D-alpha-tocopheryl-acid-succinate | 34.34 | 42.36 | 40.00 | 40.00 | 45.00 | 50.00 | 50.00 | 52.50 | 55.00 | 60.00 | 55.00 |
| Natural oil, as sweet almond oil | 65.66 | 57.64 | | 60.00 | 55.00 | | 50.00 | 47.50 | | 40.00 | 45.00 |
| Mineral oil . . . . Petrolatum | | | 60.00 | | | 50.00 | | | 45.00 | | |
| Vitamin potency, I.U. per gram | 415 | 512 | 484 | 484 | 544 | 605 | 605 | 635 | 665 | 726 | 665 |
| Consistency | Cream | Cream | Cream | Cream | Cream | Cream | Cream | Cream | Cream | Cream | Cream |

As to the Vitamin E potencies possessed by the new cream-base-co-esters of the invention, they are substantially equivalent to the amounts of d-alpha-tocopheryl-acid-succinate originally reacted with the anhydrous oils to form the ester therewith, and since formation of this ester does neither involve the replacement of methyl groups by ethyl groups nor the introduction of double bonds in the 3,4-position of alpha-tocopherol and neither a reduction in the size of the long alkyd side chain of tocopherol nor the introduction of double bonds into this side chain such as might have caused an impairment in the Vitamin E potency of the tocopherol group contained in the new ester of the invention, the Vitamin E potencies of the new ester or cream-base-co-ester of the invention has remained substantially equivalent to the amount of the d-alpha-tocopheryl-acid-succinate constituent in the same and thus constitutes another important advance in the art as it adds an extremely stable and versatile new source for Vitamin E potencies to the list of available base materials that may be employed in the manufacture of topical cream preparations soluble in both natural and mineral oil base materials.

It is easily seen from the table 3 that the employment of cream-base-co-esters based on natural oils, such as E, G and V, in admixture with mineral oil based materials leads as much to homogeneous and stable preparations as does the employment of cream-base-co-esters based on mineral oils such as, for instance, C and Q in admixture with natural oil based materials. This serves to clearly demonstrate that also as one unobvious result of the reaction between the mineral-oil-insoluble d-alpha-tocopheryl-acid-succinate and the anhydrous natural and mineral oil base materials, carried out in accordance with the method of the invention, is the formation of a new ester of the said d-alpha-tocopheryl-acid-succinate in which the mineral-oil-insolubility of the said d-alpha-tocopheryl-acid-succinate contained therein and which had been a previously unsurmountable barrier to its wider application in the art has been unexpectedly overcome.

In further support of the usefulness of the new cream-

Table 2

Examples of Compositions Representative of useful preparations of the Cream-Base-Co-Ester with partial substitution of d-alpha-tocopheryl-acid-succinate:

| Ingredients in weight percent | L | M | N | P | Q | R | O | S | T | U | V | W |
|---|---|---|---|---|---|---|---|---|---|---|---|---|
| D-alpha-tocopheryl-acid-succinate | 5.02 | 7.76 | 14.00 | 27.30 | 50.00 | 38.19 | 20.00 | 32.00 | 15.00 | 40.00 | 42.25 | 55.00 |
| Natural oil, as sweet almond oil | 65.66 | 64.65 | 56.00 | 63.60 | | | 60.00 | | | 56.00 | 52.75 | 42.20 |
| Mineral oil . . . Petrolatum | | | | | 46.72 | 58.18 | | 64.00 | 61.00 | | | |
| Magnesium stearate, as substituent | 29.32 | 27.59 | 30.00 | 9.10 | 3.28 | 3.63 | 20.00 | 4.00 | 24.00 | 4.00 | 5.00 | 2.80 |
| Vitamin E potency, I.U. per gram | 60 | 93 | 169 | 330 | 605 | 462 | 242 | 387 | 181 | 484 | 517 | 665 |
| Consistency | Cream | Cream | Cream | Cream | Cream | Cream | Cream | Cream | Cream | Cream | Cream | Cream |

Table 3

Examples of Preparations produced with some of the compositions shown in tables 1 and 2, useful as topical cosmetic and therapeutic preparations:

| Ingredients | 1 | 2 | 3 | 5 | 9 | 4 | 6 | 7 | 8 | 10 | 11 | 12 |
|---|---|---|---|---|---|---|---|---|---|---|---|---|
| Composition V, Table 2, N.O.B.*, percent | 6.25 | | | | | 12.5 | 27.44 | | | 12.5 | | |
| Composition C, Table 1, M.O.B.**, percent | | 14.81 | | | | | | 12.5 | | | | |
| Composition Q, Table 2, M.O.B.**, percent | | | 16.67 | | | | | | 8.7 | | 37.5 | |
| Composition E, Table 1, N.O.B.*, percent | | | | 12.50 | | | | | | | | |
| Composition G, Table 1, N.O.B.*, percent | | | | | 18.9 | | | | | | | 25.0 |
| Mineral oil-petrolatum, percent | 93.75 | | | | | 87.5 | | | | 87.5 | | |
| Natural oil, as almond oil (sweet), percent | | 85.19 | 83.33 | | | | 72.56 | 87.5 | 91.3 | | | 75.0 |
| Vaseline, percent | | | | 87.50 | | | | | | | 62.5 | |
| Natural oil paste,*** percent | | | | | 81.1 | | | | | | | |
| Vitamin E potency, I.U./gm./material | 32 | 71 | 100 | 68 | 114 | 65 | 141 | 60 | 52 | 68 | 204 | 151 |
| Magnesium stearate in mgs./gr./material | 312 | | | 546 | | 625 | 1,375 | | 285 | 625 | | |
| Consistency | Liquid | Liquid | Liquid | Cream | Cream | Liquid | Cream | Cream | Cream | Liquid | Cream | Cream |

NOTE.—N.O.B.* designates Natural Oil Base; M.O.B. designates Mineral Oil Base; Natural Oil Paste* designates that a thickened oil base material is used, such as one containing 89.5% sweet almond oil, 7.5% glyceryl-mono-stearate; 2.5% glyceryl-mono-palmitate and 0.5% hydrogenated peanut oil, or similar ones having a consistency similar to vaseline.

base-co-esters of the invention and preparation containing same, I will now set forth some actual cases wherein the same had been employed for therapeutic and for cosmetic reasons—

In a case of a man, age 50, who had fallen and injured his fingers in an attempt to break his fall and also suffered lacerations and traumatic swelling upon his right knee, a calcium ascorbate preparation was first employed to act as a hemostat, with the result that the bleeding at five of his finger joints and at the knee stopped within the first 5 minutes. Also the traumatic swelling at the knee receded. After cutting away skin still adhering like scraps to the injured joints, preparation W, of Table 2, was tapped directly upon the open abrasions, using about 500 milligrams for each, so as to form a creamy layer thereupon, and this was also applied in the same manner to the knee, using about 2 grams because of the large size of the laceration at the knee, measuring about 3.5 inches in diameter. A bandage was applied to all joints and the knee and removed the next day. The pain had completely subsided already within the first hour following the application of preparation W, which application was renewed on the second day and the third day, after which the wounds were left open following a 4th application of preparation W which was rapidly absorbed. Repeated further applications and rubbing in of application W, three times a day, leaving the wounds open to air access, led on the 7th day to scab dropping at 2 finger joints, on the 8th day to scab dropping at two more finger joints and the knee, and on the 9th day to scab dropping at the last joint, whereby it was observeed that all the scabs had remained soft and pliable during the period of sealing until they dropped off, and that practically no scars remained. The rapid healing at finger joints which usually heal only with difficulty and with every finger movement scabs formed will crack, and the immediate pain relief were ascribed to the Vitamin E effect of the usually high potency preparation W, possessing a Vitamin E potency of 665 I.U. per gram material.

In a case of an apparently non-healing cracked lip which was also painfully swollen and inflamed and had been treated with a variety of lip pomades without success for the last 2 months, preparation D, of table 1, was applied by carefully massaging it into the lip, about 300 milligram at a time, and repeating this 3 times a day for the first day. On the second day the swelling had subsided and the pain disappeared and, continuing this mode of treatment to the third day, it was observed that the deeply fissured crack in the lip had closed and a pliable skin replaced the previously scrappy looking lip surface. Advise was given to use preparation D as a cosmetic and therapeutic lip cream for the maintenance of healthy lips. Also, advice was given to avoid the use of lip-pomades. The good results obtained with the use of preparation D were ascribed to its high Vitamin E content which is thought to be at least partially responsible for the rapid relief in this case in which increase in the micro-circulatory activity of the mucous membrane covering the skin of the lip might have been the essential factor that caused such immediate relief and restoration of lip health, particularly also in confirmation of the findings by Kamimura (see—Shinyakuto-Rinsho, Vol, 11, 1961, p. 1021) and Yano (see—Supporo Med. J., Vol. 18, 1960, p. 158 and p. 236; also Vol. 16, 1959, p. 449) who had established that Vitamin E exerts a beneficial effect upon the microcirculatory activity of the skin and thereby benefits skin health.

In a case where the third finger and palm of the left hand, of a 36 year old man, suffered on a protracted progressive keratodermia, the finger and the palm were treated with preparation P, of table 2, daily, for a period of two weeks, by applying 1 gram of preparation P twice daily to the affections. Reasoning that DeRitter (see—American Perfumer & Aromatics, May 1959, p. 55) had already called attention to the strong itch-relieving and wound-healing effects of Vitamin E, and since the dermal afflication in this case was extremely itchy, the choice was preparation P for it contained 330 I.U. Vitamin E potencies per gram of material, with the result that not only did the itching stop and further progress in the keratodermia halted, but also the bandages upon finger and palm could be removed after the first week on this treatment while though continuing the treatment by rubbing the preparation into the slowly healing lesions for another week so as to allow the air to get to it. The daily application of preparation P was then reduced to one application a day and since the lesions had resolved partially at that time and were smaller than before, only 200 milligrams per lesion were now applied with each treatment until with the end of 4 weeks the treatment was terminated. Similarly good results had previously already been reported in the treatment of a progressive keratodermia by Mizogushi (see—Dermatologica et Urologica, Japan, 14, 1960, pg. 749) however using smaller amounts of Vitamin E in his ointments and requiring a longer period of time for the treatments, thereby indicating that the amounts of Vitamin E in such treatments might play an important role.

In a case of a thermal burn, caused by a frying pan, three inches long and about one and a half inches wide, on the right arm and causing great pain and discomfort, preparation 6, in table 3, having a Vitamin E potency of 141 I.U., was immediately applied to the burn by covering the complete area of the same with about 4 grams of this preparation. As already reported in the literature, this application of Vitamin E caused an almost immediate relief from pain. This was followed by renewing the layer of preparation 6 at the surface area of the burn as soon as it was absorbed and, following this, on the third day, the healing could already be observed. At no time was a bandage required and application of about 300 milligrams thereafter, daily, for another 3 days sufficed to terminate the treatment, leaving hardly a scar.

In still another case of a severely ill woman who had developed bedsores, application of preparation 12, of table 3, constaining 151 I.U. Vitamin E per gram material, by rubbing about 500 millgrams per rub and per square inch bedsore area carefully into the bedsores, three times a day, which was followed by immediate relief from pain and irritation in the affected area and prompt healing in one week's time. Three other women received the same treatment and were likewise fully relieved within about one week's time, but told to use forthwith the preparation as a precautionary measure to prevent bedsores from developing, with the result that since then neither of the women suffered a recurrence. A fifth woman, whose bedsores were particularly severe, had also used preparation A, of table 1, containing 415 I.U. Vitamin E per gram and, although being more afflicted than the other women, found relief as fast as the other women did, apparently as result of the higher Vitamin E concentration in preparation A.

A man suffered from a severe nasal congestion, with inflamed nasal mucosa and hyperemia of the nasal passages. He was treated with preparation F, of table 1, which is a cream, by smearing into the inside of the nose an amount of about 500 milligrams each time, three times a day, followed by an almost immediate relief of the congestion already on the first day and a marked reduction in the hyperemia and inflammation of the nasal mucosa. He could breathe again freely. He was advised to continue using the preparation whenever he felt a new congestion developing or as a preventive action. Similar results had been reported by Teatini (see—Minerva Otorinolaringologica, 13, 1963, p. 290) who, using a pomade containing but a small amount of Vitamin E, ascribed the relief he obtained in his treatment of acute and chronic nasal conditions associated with hyperemia of the nasal passages as being due to the antiphlogistic and anti-hyperemic effectiveness of Vitamin E in his preparation.

A woman who had been suffering for years with recurring ulcerations had developed three small ulcers at the inside of her right leg, one close to the ankle and two about midway between ankle and knee. The ulcer at the ankle was about the size of a quarter (25¢ piece) and the two other ulcers were about the size of a 50¢ piece. They were open and oozing.

Since many cases are described in the literature treating ulcers of the legs with Vitamin E ointments (see—Matoley—The Summary of the Shute Institute, Vol. 15, June 1963, pages 14 to 15), the woman was treated with preparation M, table 2, by applying to each ulcer about 500 milligrams each of the cream, at first three times a day and covering up, three days in a row. This was followed on the 4th day by changing to preparation 11, of table 3, having a higher Vitamin E. potency per gram than preparation M as it was thought that higher concentrations of Vitamin E might be more successful than lower ones. Although the pain in her ulcers was at the start of the treatment excruciating, and had completely subsided already after the third day's treatment, and the ulcers showed again signs of decreasing in size and scab formation on the 5th day, they were still oozing fluid, so that the treatment was changed to preparation E, of table 1, in the hope that the high Vitamin E potency of this preparation might do a better job. This was confirmed, as already on the 7th day two of the ulcers closed and formed a scab which was very elastic. All swelling about ankle and legs had disappeared. On the 8th day, too the ankle ulcer closed. The healing ulcers were left open to access by air after the 6th day, and from the 9th day the treatment was limited to once a day, thereby keeping the scabs soft. On the 14th day, all scabs came off and the treatment was discontinued.

The increased effectiveness of Vitamin E as its dosage increased is thought to be due, at least partially, to its micro-circulation increasing affects upon the skin.

A case of severe sunburn was treated with preparation 4, of table 3, which is a liquid, for the proper penetration of the lesion, whereby Vitamin E acted extremely soothing. This was followed, after one hour, by applying the preparation 12, of table 3, which is a cream, to the burned area, three times a day, without covering, each time using about 500 milligrams per square inch of sunburned area. This resulted in a surprisingly rapid relief of pain already on the second day and full recovery with visible signs of full regeneration of the burned area on the 4th day. Advice was given to use preparation 12 as a protective against sunburn as well as in the treatment of sunburns.

Three cases of napkin dermatitis or diaper rash was treated with preparation 7, of table 3, after preliminary washing the lesions with the liquid preparation 3, of table 3, for its soothing effect upon the highly sensitive area, requiring as per square inch area of the rash about 500 milligrams each, and then followed by about 1 gram per square inch area of the rash application of the cream 7. With the next washing of the area, which again was carried out with preparation 3, already a marked improvement in the rashy area was noticeable and the sensitivity was greatly reduced as was the pain. The treatment was continued by switching to preparation 6, of table 3, to thereby increase the Vitamin E potency of the treatment. Washing being carried out each time with preparation 3, and treatment continuing with preparation 6, after every washing, on the 3rd day, there was hardly a sign left to indicate that there had been a rash although advice was given to continue washing the napkin areas with preparation 3. Also use of preparation 8, of table 3, or preparation 1, of table 3 as a substitute for preparation 3 were suggested to prevent napkin dermatitis to recur.

In a case where extreme roughness of the skin, dryness, cracks and fissuring also about the nails, hands and face was apparent and the general use of skin ointments and cosmetica had given no relief, treatment with preparation G, of table 1, succeeded. Having a Vitamin E potency of 605 I.U. per gram, and highly absorbable by the skin and absolutely nonhydrous, it was thought that the Vitamin E in high concentrations could be worked into the affected areas to exert therein its microcirculation increasing effects and revitalize the same. Thus, rubbing preparation G into the affected areas, at an approximate level of one gram per square inch area, three times a day and at night, saturation of the affected areas was apparently achieved as within one week's time, the skin which had been dry and hard had softened and allover taken on a younger appearance, fissures at least partially resolved, roughness became smooth, cracks healed, and there was a smoothness apparent as if the same had been revitalized. The woman was advised to continue using the preparation as a cosmetic help in maintaining good skin health.

In a case of a women who could not resist the urge to scratch herself all over her body as she suffered from an uncontrollable itching sensation which had grown worse with the years. She was given preparation D, of table 1, for rubbing it into the itching areas whenever it itched, in an amount of about 500 milligrams per square inch area each time to be used when the need might arise. Also, she was given preparation 3, of table 3, for use in areas not well suitable for treatment with a cream. Surprisingly enough, already on the first day of using preparation D and 3, a complete relief from itching was attained and the woman keeps both preparations handy in case itching may start up again.

Since now the benefits of the new d-alpha-tocopheryl-acid-succinate cream-base-co-esters of the invention are clearly apparent, and their use in natural and mineral oil base topical cosmetic and therapeutic preparations here documented and indicated that a wider use of the desirable mineral-oil-insoluble d-alpha-tocopheryl-acid-succinate-derived Vitamin E potencies can now be made because of the newly acquired mineral-oil-solubility of its newly formed cream-base-co-esters with anhydrous oils.

What I claim is:

1. A method of preparing the reaction product of the mineral-oil-insoluble d - alpha - tocopheryl-acid-succinate with an anhydrous oil, which comprises reacting d-alpha-tocopheryl-acid-succinate and an anhydrous oil selected from the group consisting of mineral oil, petrolatum, and sweet almond oil, at an elevated temperature of from about 110° to 145° C., removing the water formed during the reaction and recovering the stable, homogeneous, natural- and mineral-oil-soluble reaction product thereby produced.

2. A method according to claim 1, wherein from about 34.34 to 60 parts by weight percent of said d-alpha-tocopheryl-acid-succinate are reacted with from about 65.66 to 40 parts by weight percent of said anhydrous oil, said proportions being based on the total weight of the reaction product.

3. A method according to claim 1 wherein from about 5.02 to 55.00 parts by weight percent of said d-alpha-tocopheryl-acid-succinate are reacted with from about 65.66 to 42.20 parts by weight percent of said anhydrous oil and from about 29.32 to 2.80 parts by weight percent of magnesium stearate, said proportions being based on the total weight of the reaction product.

4. A method as claimed in claim 1 wherein d-alpha-tocopheryl-acid-succinate is reacted with sweet almond oil.

References Cited

UNITED STATES PATENTS

| | | | |
|---|---|---|---|
| 3,538,119 | 11/1970 | Grant | 260—345.5 |
| 3,657,279 | 4/1972 | Higashi et al. | 260—345.5 |

UNITED STATES PATENTS

Wilson et al., "Textbook of Organic Medicinal and Pharmaceutical Chemistry," pp. 808–9 (4th Ed.) 1962, RS 403W7.

JOHN M. FORD, Primary Examiner

U.S. Cl. X.R.

424—284